Sept. 30, 1930.　　　R. P. LANSING　　　1,777,172
ENGINE STARTER
Original Filed June 28, 1926　　2 Sheets-Sheet 1
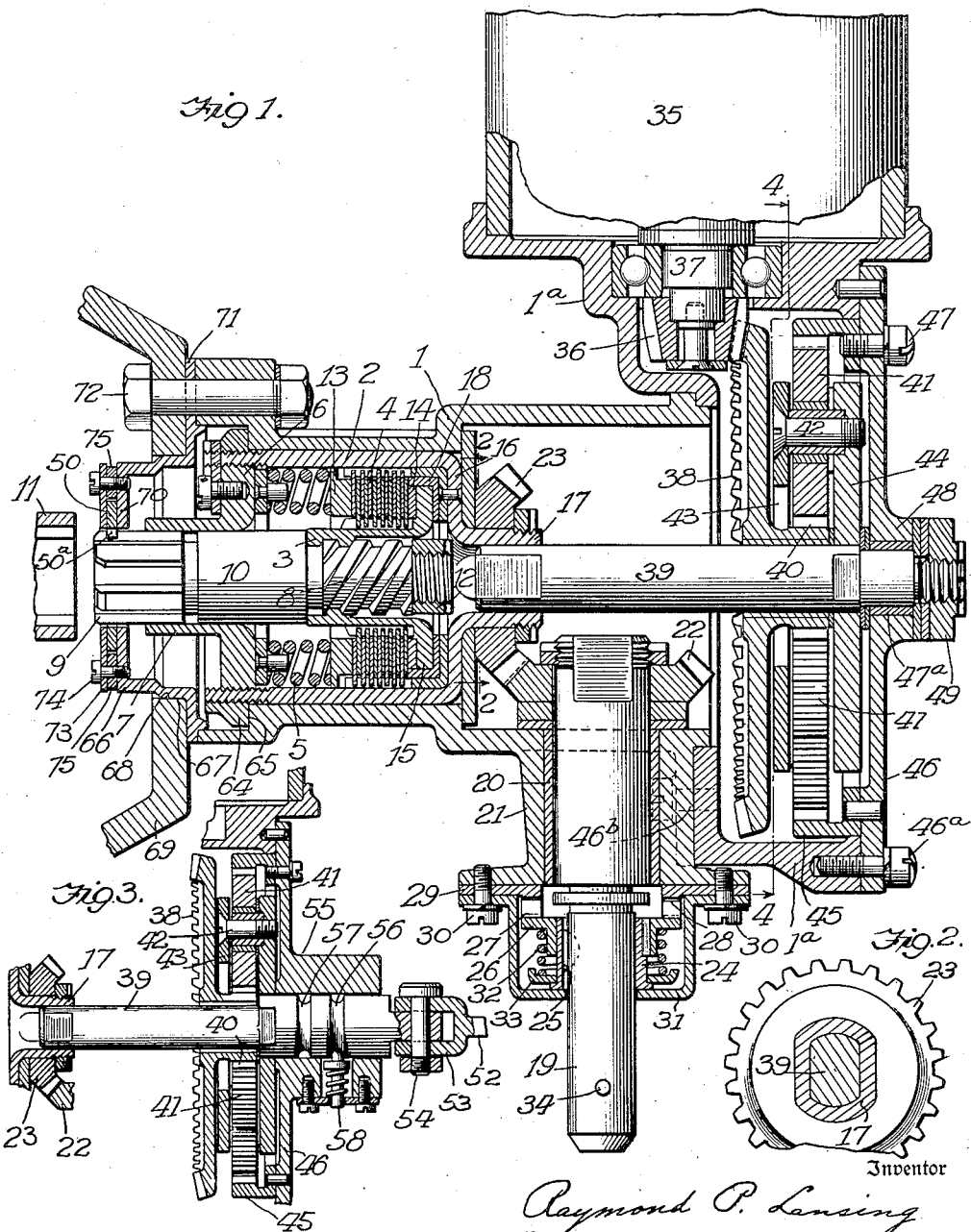

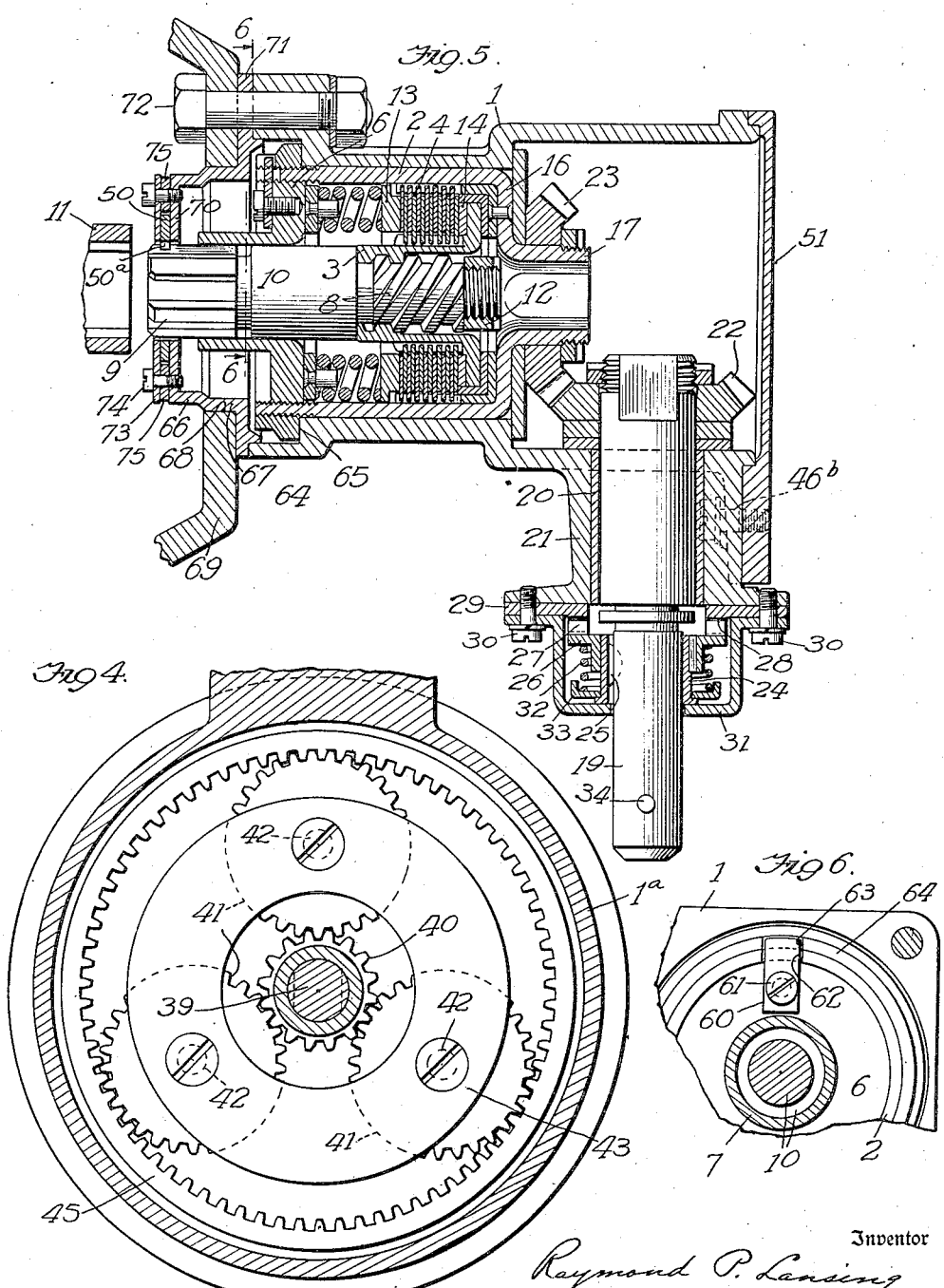

Patented Sept. 30, 1930

1,777,172

UNITED STATES PATENT OFFICE

RAYMOND P. LANSING, OF MONTCLAIR, NEW JERSEY, ASSIGNOR TO ECLIPSE AVIATION CORPORATION, OF EAST ORANGE, NEW JERSEY, A CORPORATION OF NEW JERSEY

ENGINE STARTER

Original application filed June 28, 1926, Serial No. 118,937. Divided and this application filed September 13, 1929. Serial No. 392,407.

My invention relates to engine starting apparatus for the starting of internal combustion engines, more particularly but not necessarily the engines of airplanes, and the object thereof is to provide a simple, efficient and reliable apparatus of this character for either power or manual operation, or both combined, the apparatus, in its preferred form, being primarily a manually operated apparatus but such that the power operating elements may be readily applied to and detachable from the apparatus. Various features of advantage and utility in the construction and operation of my apparatus will be apparent from the description hereinafter given.

In the drawings,

Fig. 1 is a sectional elevation of my apparatus with both the power and the manual mechanisms embodied therein;

Fig. 2 a section on the line 2—2 of Fig. 1;

Fig. 3 a detail section of the modified form of construction as to a part thereof;

Fig. 4 a section on the line 4—4 of Fig. 1;

Fig. 5 a view similar to Fig. 1 but with a power mechanism removed;

And Fig 6 a detail section on the line 6—6 of Fig. 5.

Referring to the complete apparatus as illustrated in Fig. 1, the same comprises essentially the drive or transmission proper including a driving member normally disengaged from but adapted to engage the engine member, the power mechanism such as an electric motor and including reduction gearing operatively connected therewith, and a hand cranking mechanism operatively connected with the drive or transmission.

First describing the drive or transmission as herein shown, the same is located and mounted within a main casing 1 within which rotates a barrel 2 and a nut 3 concentrically arranged therewithin and providing a considerable annular space between them, in order to receive a yielding driving connection which is here in the form of a friction clutch 4. The sets of plates of this clutch are splined respectively to the interior of the barrel and the exterior of the nut, and the proper spring pressure is provided for such friction plates by means of a series of springs 5 which are located in such annular space. The necessary spring tension is obtained by the adjustable nut 6 which is provided with a sleeve portion 7. This nut cooperates with internal screw threads in the barrel 2.

Within the nut 3 and the sleeve 7, there is mounted for longitudinal and rotary movement a shaft having towards one end screw threads 8 and at the other end a driving member 9 and an intermediate plain portion 10. The screw threads 8 are threaded to the internally threaded nut 3 and the driving member 9 as a series of splines adapted to engage corresponding splines in the end of the hollow or socketed end of the crank shaft 11 or rotatable shaft of the engine, not otherwise shown. A stop nut 12 is secured to the screw threaded end of the screw shaft to limit the left-hand movement of such shaft, Fig. 1.

According to the illustrated construction, the plates of the friction clutch 4 are held between the rings 13 and 14, the ring 14 bearing against the marginal flange 15 of the nut 3. The barrel 2 is inwardly and then outwardly flanged at its right-hand end, Fig. 1, in order to form a flange portion 16 and a central hub 17. A bushing 18 is interposed between the flange or end portion 16 of the barrel and the flange 15 of the nut.

Next describing the manual or hand cranking mechanism, the same comprises a cranking shaft 19 which has its bearing in a bushing 20 located in an opening through a boss or extension 21 of the main casing 1. The cranking shaft is provided at its inner end within the casing 1 with a bevel pinion 22 meshing with a corresponding bevel pinion 23 which is secured to the hub 17 of the barrel 2.

Means are preferably provided for locking the cranking shaft, and consequently, the driving barrel 2 against backward rotation, such as occasioned at times by back-fire of the engine. The means herein shown comprise a sleeve 24 which is keyed to the cranking shaft by the key 25 and on which is splined and thereby adapted to slide the movable member or sleeve 26 of a ratchet clutch. This sleeve has on its inner face ratchet teeth 27 adapted to cooperate with complementary teeth 28 on the outer face of a plate 29 which is clamped by the screws 30 between the end cap 31 and the end of the boss or extension 21. The movable ratchet member is normally held in engagement with the stationary member by a spring 32 interposed between such movable member and an abutment 33 at the outer end of the cap 31. This ratchet mechanism permits the cranking shaft to rotate in one direction only. This shaft is provided with the usual cranking pin 34 adapted to receive an ordinary hand crank.

Next referring to the power mechanism, the same comprises as herein shown a prime mover, such as an electric motor 35 provided with a driving pinion 36 secured to one end of its armature shaft 37. The power mechanism also includes reduction gearing, which is here of the planetary type comprising a large rotatable bevel gear 38 with which the pinion 36 meshes and which is loosely mounted upon the central or power transmitting shaft 39 of the reduction gearing. The hub of the gear 38 is formed as a pinion 40 constituting the sun gear or pinion and meshing with the three planetary pinions 41 which are mounted to revolve and to rotate on studs 42 in a frame or cage consisting of two parallel plates 43 and 44 between which said planetary pinions are adapted to rotate on said studs. These planetary pinions mesh with a large stationary gear 45 which is secured to the end plate 46 in suitable manner as by means of the screws 47. This plate 46 is secured by bolts 46ᵃ to an intermediate casing 1ᵃ which is itself secured to main casing 1 by screws 46ᵇ being the same screws by which the cover plate 51 is secured in place. The casing 1ᵃ also forms the lower end head of the electric motor. The shaft 39 is secured to the rotatable plate 44 and is adapted to be driven thereby. The extreme outer end of such shaft 39 has its bearing in a bushing 47ᵃ in the central bearing portion 48 of the plate 46. This shaft 39 is held in proper position by means of the nut 49 screwing onto the outer end thereof.

Describing the operation of my apparatus and assuming that the hand cranking mechanism is the one employed for the cranking of the engine, an ordinary hand crank is applied to the cranking shaft 19 and the same thereby rotated with the result that the barrel 2 will be rotated through he medium of the pinions 22 and 23, hub 17, and flange 16. The torque is then transmitted through the friction clutch to the nut 3 and, because of the screw thread-connection between such nut and the screw shaft and because of the fact that such screw shaft is prevented from turning by means of a friction plate 50 which engages the driving member 9, such screw shaft will be advanced longitudinally to the left, Fig. 1, and into engagement with the engine member 11. When this screw shaft reaches the limit of this longitudinal movement by reason of the contact of the stop nut 12 with the ends of the thread within the nut 3, such shaft will partake of the rotary movements of the nut and barrel, and the engine will thereupon be cranked.

When the engine starts on its own power, the screw shaft will be automatically disengaged from the engine member in the well-known manner by the screw action between it and its nut.

Now describing the operation when the electric motor is employed for cranking the engine, when such motor is energized, the pinion 36 will be rotated and likewise the shaft 39 will be rotated through the medium of the planetary gearing. The barrel 2 will thereupon be rotated with the functioning and results hereinbefore explained.

The apparatus is a convertible one and the same is a manually operated apparatus, but provision is made for the ready and convenient attachment of the power mechanism including the ready and convenient attachment of the driving mechanism thereof with such primary apparatus. To this end, the electric motor and the reduction gearing are made as a connected unit and the same is adapted to be readily and detachably fitted to the main casing 1 and its boss 21 of the apparatus. When the apparatus is merely a manually operated one, the outer end of the casing 1 closed by a removable plate 51 which is removed when the power mechanism is applied. The shaft 39 is a part of the reduction gearing assembly and the inner end thereof is insertable in the hub 17 of the driving barrel 2 whereby the same is drivingly connected therewith by mere insertion in such hub 19.

According to the construction shown in Fig. 1, the shaft 39 and attached reduction gearing are operated whenever the cranking shaft 19 is operated, and therefore, the cranking shaft is loaded to that extent. In order to eliminate this load, I have provided the modified construction illustrated in Fig. 2 according to which the operator is enabled to withdraw the shaft 39 from the hub 17 of the driving barrel 2 whereupon such shaft and associate parts will not be rotated, but only those parts between the cranking shaft and the engine, the same constituting the drive or transmission between such cranking shaft and the engine. As shown in Fig. 3, the shaft 39 is adapted to be shifted longitudinally and to be withdrawn from the hub 17 by being pulled outwardly by the operator. In the present instance, I have shown, for this purpose, a rod 52 which extends to within a convenient reach of the operator in the cockpit of the airplane when the device is used in connection with an airplane engine and having at its inner end a yoke 53 attached by means of the pin 54 to the outer end of the shaft 39. This shaft at the point where it slides through the extended boss 55 of the cover plate 46 is provided with two circumferential grooves 56 and 57 with which cooperates a spring pressed plunger 58. These grooves determine the operative and inoperative positions respectively of the shaft 39 and serve to yieldingly hold such shaft in one of these positions or the other. When the plunger is in the groove 56 as shown in Fig. 3, the shaft 39 is in operative position because it is then in engagement with the hub 17, but when such shaft is pulled outwardly and the plunger engages the groove 57, such shaft is then in inoperative position because it has been withdrawn from its driving engagement with the hub 17, which thereby disables the gearing and power means.

In order to hold the nut 6 in proper adjusted position, suitable means are employed such as that shown in detail in Fig. 6, the same comprising a flat plate 60 which is removably secured to the nut by the screw 61 and seats in a groove 62 in the end of the barrel 2 and in a groove 63 in the fastening nut 64. This latter nut screws onto the exterior of the barrel and by bearing against the shoulder 65 in the interior of the main casing 1 holds the barrel in proper operative relation therein. This plate 60 locks together all three members 6, 2 and 64 and thereby maintains the predetermined adjustment or setting of the nut 6.

As herein shown the friction plate 50 and its associated parts are made as an assembly for the purpose described and for the additional purpose of an engine pilot particularly one of small diameter. This friction plate assembly comprises a casing 66 of two different diameters of which the larger one 67 is used as the pilot diameter to fit the opening 68 of the engine casing which is here the crankcase 69. The casing 66 has an outer end flange 70 which is inwardly directed and provided with a central opening through which the driving member 9 travels. This casing also has an inner end flange 71 which is outwardly directed and clamped between the end of the main casing 1 and the crankcase 69 by suitable bolts, one of which 72 is shown in the drawings.

The friction plate 50 which is the form of a ring with projections 50ª into the splines of the driving member 9 is frictionally clamped between the flange 70 and the ring 73 by means of the screws 74 which are provided between such flange and ring with slightly dished spacing washers 75.

By the use of my construction as described, I am enabled to use a comparatively small diameter of engine casing opening without decreasing in proportion the dimensions of the drive or transmission, particularly of the clutch assembly.

The present application is a division of my co-pending application, Serial No. 118,937, filed June 28, 1926.

What is claimed is:—

1. An engine starter including a rotatable longitudinally movable shaft having a driving member adapted to engage and drive a member of the engine to be started, said shaft having external screw threads, a nut which is internally screw threaded and to which said shaft is threaded, a driving barrel concentric of the nut, a friction clutch operatively connecting the barrel and nut, spring means cooperating with the clutch, and an adjustable nut for such spring means, said latter nut having a sleeve portion forming a guide for said shaft.

2. An engine starter including a central rotatable and longitudinally movable driving member, a shell surrounding and cooperating with such member, a driving barrel concentric with the shell, the friction clutch between the barrel and shell, and clutch tightening means including a ring adjustably mounted on the barrel and cooperating with the clutch and a locking device therefor.

3. An engine starter including a central rotatable and longitudinally movable driving member, a shell surrounding and cooperating with such member, a driving barrel concentric with the shell, a friction clutch between the barrel and shell, and clutch tightening means including a ring adjustably mounted on the barrel and cooperating with the clutch and a locking device therefor consisting of a plate secured to such ring and engaging the end of the barrel.

4. An engine starter including a central rotatable and longitudinally movable driving member, a shell surrounding and cooperating with such member, a driving barrel concentric with the shell, a friction clutch between the barrel and shell, a ring mounted on the exterior of the barrel, and clutch tightening means including a second ring adjustably mounted on the interior of the barrel and a locking device therefor consisting of a plate secured to such second ring and engaging the first ring and the end of the barrel.

5. An engine starter including a central rotatable and longitudinally movable driving member, a shell surrounding and cooperating with such member, a driving barrel concentric with the shell, a friction clutch between the barrel and shell, and clutch tightening means including a ring adjustably mounted on the barrel and cooperating with the clutch, said ring having a sleeve portion functioning as a bearing for the driving member.

6. In an engine starter, in combination with an engine casing provided with an opening and a rotatable member of an engine adjacent thereto, a drive comprising a casing, and operating mechanism therein including a rotatable and longitudinally movable driving member adapted to engage the engine member and to crank the engine, and a friction device assembly arranged between the engine casing and drive casing and including a casing centering as a pilot into the opening of the engine casing and also including in such assembly a friction means cooperating with said driving member.

7. In an engine starter, in combination with an engine casing provided with an opening and a rotatable member of an engine adjacent thereto, a drive comprising a casing, and operating mechanism therein including a rotatable and longitudinally movable driving member adapted to engage the engine member and to crank the engine, and a friction device assembly arranged between the engine casing and drive casing and including a casing entering as a pilot into the opening of the engine casing and also including in such assembly a friction means cooperating with said driving member, said casing of the assembly being of lesser diameter than the drive casing.

8. In an engine starter, in combination with an engine casing provided with an opening and a rotatable member of an engine adjacent thereto, a drive comprising a casing, and operating mechanism therein including a rotatable and longitudinally movable driving member adapted to engage the engine member and to crank the engine, and a friction device assembly arranged between the engine casing and drive casing and including a casing entering as a pilot into the opening of the engine casing and also including in such assembly a friction means cooperating with said driving member, said assembly casing having an inner outwardly directed flange clamped between the drive casing and the engine casing.

9. In an engine starter, in combination with an engine casing provided with an opening and a rotatable member of an engine adjacent thereto, a drive comprising a casing, and operating mechanism therein including a rotatable and longitudinally movable driving member adapted to engage the engine member and to crank the engine, and a friction device assembly arranged between the engine casing and drive casing and including a casing entering as a pilot into the opening of the engine casing and also including in such assembly a friction means cooperating with said driving member, said assembly casing having an outer inwardly directed flange with an opening through which said driving member travels, a ring secured to such flange, and a plate clamped frictionally between the ring and flange and having central projections to engage the driving member to impart a drag to the rotation thereof and to insure its endwise travel.

In testimony whereof I have signed this specification.

RAYMOND P. LANSING.